United States Patent [19]
Johnson et al.

[11] Patent Number: 5,237,257
[45] Date of Patent: Aug. 17, 1993

[54] METHOD AND APPARATUS FOR DETERMINING BATTERY TYPE AND MODIFYING OPERATING CHARACTERISTICS

[75] Inventors: Robert M. Johnson, Lake Zurich; Michael P. Metroka, Algonquin, both of Ill.

[73] Assignee: Motorola, Inc., Schaumburg, Ill.

[21] Appl. No.: 851,460

[22] Filed: Mar. 16, 1992

Related U.S. Application Data

[62] Division of Ser. No. 341,778, Apr. 21, 1989, Pat. No. 5,164,652.

[51] Int. Cl.$^5$ ............................................. H02J 7/00
[52] U.S. Cl. ........................................ 320/2; 320/15; 320/48

[58] Field of Search .......................... 320/15, 20, 48, 2

[56] References Cited

U.S. PATENT DOCUMENTS

| | | | |
|---|---|---|---|
| 4,006,396 | 2/1977 | Bogut | 320/2 |
| 4,392,101 | 7/1983 | Saar et al. | 320/20 |
| 4,746,852 | 5/1988 | Martin | 320/20 |
| 4,849,682 | 7/1989 | Bauer et al. | 320/15 |
| 4,965,738 | 10/1990 | Bauer et al. | 320/39 X |

*Primary Examiner*—R. J. Hickey
*Attorney, Agent, or Firm*—Raymond A. Jenski; Kirk W. Dailey

[57] ABSTRACT

A battery type detector for battery-using and battery-charging equipment is disclosed. Operational characteristics of the using and charging equipment is modified in accordance with the battery type detected.

12 Claims, 7 Drawing Sheets

METHOD AND APPARATUS FOR DETERMINING BATTERY TYPE AND MODIFYING OPERATING CHARACTERISTICS

This is a division of U.S. application Ser. No. 07/341,778, filed Apr. 21, 1989, now U.S. Pat. No. 5,164,652.

BACKGROUND OF THE INVENTION

This invention generally relates to the method and apparatus for determining the type of battery supplying power to battery operated equipment and being charged by battery chargers. This invention more particularly relates to a method and apparatus which will detect the type of battery connected to a circuit of the battery operated equipment on the basis of a predetermined voltage potential supplied at a test terminal of the battery and which will select one or more operating parameters for the using or charging equipment to optimize battery performance.

Operationally, batteries of different types (such as those characterized by chemical components—Lithium, NiCd, Lead Acid, Alkaline, etc.—and those characterized as rechargeable or non-rechargeable) exhibit different end of life voltage characteristics and effective series resistances. Since different types of batteries can be interchangeably used to provide power for the same equipment (i.e. for a Cellular Portable Telephone), knowledge of the type of battery may be useful to the equipment in establishing operating parameters such as transmitter output power or in warning the user of a "low battery" condition.

Nonrechargeable battery types should not be subjected to recharging attempts. Battery types that can be charged should be charged at differing rates and with differing conditions. A battery charger which accepts all battery types ideally should adapt the rate of charge (charge current) and the types of charge controls used in accordance with the battery type. Although it is known that the charge rate of a battery may be optimized in accordance with the charge capacity of the battery (U.S. Pat. No. 4,006,396 discloses a battery and charger apparatus which employs an electrical element within the battery housing itself to provide a signed characteristic of the battery's charge state and which is employed by a charger circuit to control the rate of charge for the battery). This optimization is not changeable based on battery type and is limited to rate-of-charge determination. Therefore, it would be useful for a battery charger to automatically recognize the battery type which is to be charged and adapt its charging parameters accordingly.

SUMMARY OF THE INVENTION

It is, therefore, one object of the present invention to detect which type of battery is coupled to battery using or charging equipment.

It is another object of the present invention to select and modify use parameters in battery powered equipment according to the type of battery connected.

It is further object of the present invention to select and modify charge control parameters in battery charging equipment according to the type of battery connected.

DESCRIPTION OF THE PREFERRED EMBODIMENT

This invention is particularly adapted for use in and with electrical equipment which can interchangeably couple to two or more different types of batteries. This equipment (for example, a portable radiotelephone) may "sink" power from a battery and deplete the battery charge. Alternatively, the equipment may be equipment which "sources" power to the battery in order to recharge the battery. The present invention is intended to power portable electronic equipment which provides low battery alerting to the user and which may vary the operational characteristics of the equipment. In a portable cellular radiotelephone, one operational characteristic which may be varied is that of transmitter power output level. The present invention is also intended to be used in battery chargers having the capability of charging two or more different battery types.

Figure 1:
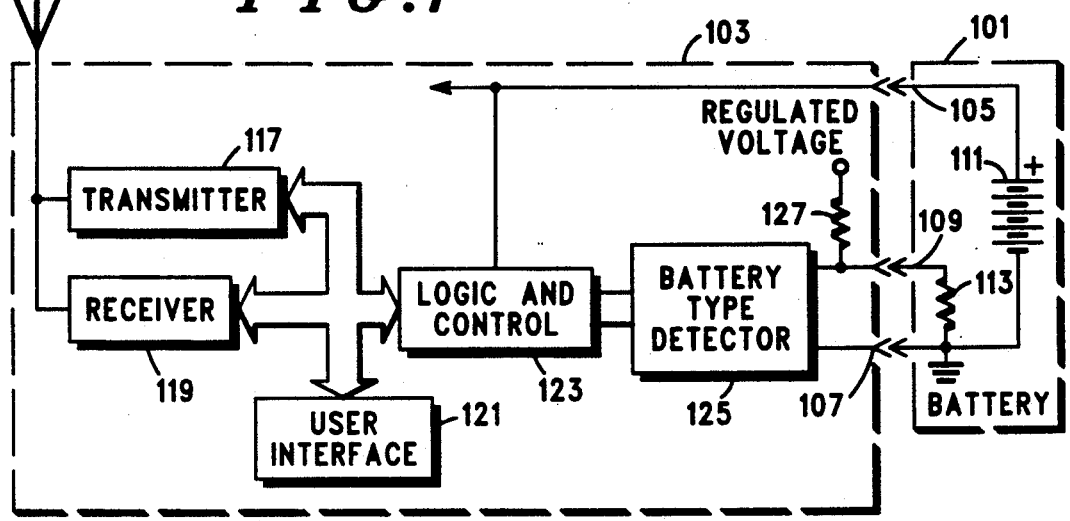
FIG. 1 is a block diagram of a portable radiotelephone transceiver and battery which may employ the present invention.

A block diagram of a portable radiotelephone which may utilize the present invention is shown in FIG. 1. A battery 101 is shown coupled to a radio transceiver 103. There may be at least three electrical connections between the battery 101 and the transceiver 103; these connections supply primary battery power (105), ground (107), and sense input (109). Within the battery 101 is found a conventional electrochemical cell or cells 111 which provide direct current electrical energy from a chemical reaction. The electrochemical cell type may be determined by capacity, effective resistance, physical construction, type of chemistry, or any other parameter pertinent to its use. A battery may have any number of like cells or combination of different cells. In some conditions, however, different batteries may have different characteristics but their use in a specific application may be identical enough for the batteries to be considered the same battery type. Nevertheless, when batteries of different characteristics perform differently in the specific application, they are considered herein to be different battery types.

A sensing electrical component 113 (such as a resistor, a thermistor, an open circuit, a short circuit, or other elements which may provide auxiliary sensing capability) is utilized in the present invention to provide an electrical signature indication of battery type. In the preferred embodiment, the sensing element 113 is connected between sense input contact 109 and ground contact 107 of the battery 101, however, other connections may provide equally useful sensing capabilities.

The transceiver 103 (which may be a model F09HGD8453AA portable cellular radiotelephone available from Motorola, Inc.) consists of a conventional radio transmitter 117 a conventional radio receiver 119, a user interface 121 (which may further include an earpiece and microphone, dialing and control mechanisms, and visual and/or aural indicators such as an LED light or a bar graph on a display or a numerical indication of battery charge), logic and control functions 123 (which in a cellular portable radiotelephone of the aforementioned type may utilize a MC68HC11A8 microprocessor or equivalent and associated memory and circuitry), and a battery type detector 125.

The battery type detector 125 must be compatible with and capable of identifying the battery type electrical signature created with the selection of the electrical component 113 within the battery 101. The battery type detector 125 measures a sense input signal which is generated from a regulated voltage reduced in proportion to the ratio of resistor 127 and the effective impedance of electrical component 113 in the battery 101. The electrical component 113 is given a different electrical parameter valve for each different battery type. Thus, in the preferred embodiment, the sense input is determined by the voltage divider formed by resistor 127 (having a resistance value of 15K Ohms) and resistor 113 (having a value as shown in Table 1). Since resistor 113 is given a different value of resistance for each battery type, the sense input voltage is a different value for each battery type. Based upon the value of the sense input as measured by detector 125, the radio transceiver 103 determines which battery type is connected and adjust its operating parameters accordingly.

TABLE 1

| Battery Type | Component 113 Value (Ohms) |
|---|---|
| 0 (manual test) | 0–1K |
| 1 (NiCd) | 1K–2K* |
| 2 | 2K–3K |
| 3 | 3K–5K |
| 4 | 5K–10K |
| N (default) | 10K |

*thermistor

One of the operating parameters which may be adjusted is that of the low battery alert which is provided to the transceiver user via user interface 121. Conventionally, battery voltage is measured by the electrical equipment and when the battery voltage drops below a predetermined threshold, a light is lit or other indication is given to the user that the battery has reached the end of its useful battery charge. The equipment, typically, will be allowed to operate only for a limited duration after the low battery detection is made. A second battery voltage threshold may be included in a conventional circuit which entirely turns off the equipment thereby protecting such battery types as NiCd or lithium types which cannot be discharged below a certain charge without permanent damage to the electrochemical cells. Nonrechargeable batteries, however, do not require this minimum discharge voltage protection and can be fully discharged. A third battery alert parameter, the hysteresis voltage, may be included in a conventional circuit. Hysteresis is used to keep the unit from exiting low battery alerting when the equipment changes modes causing the battery discharge rate to change. This discharge rate change may change the battery terminal voltage enough s that is will now exceed the low battery alert voltage threshold and alerts will stop. By adding the hysteresis voltage to the low battery alert threshold voltage, the equipment will not exit low battery alerts. A second set of these voltage parameters may be used in a conventional circuit where there are two distinct modes of operation such as receive and transmit. Furthermore, different battery types have different characteristics of terminal voltage and amount of discharge (See FIG. 7.). Thus, a predetermined and fixed voltage threshold for indication of low battery charge or equipment turn off may be optimum for one battery type but non-optimum for another battery type.

The output of detector 125, then, can inform logic and control function 123 of the type of battery connected. Logic and control function 123 will scan its associated memory for one or more voltage threshold values which are optimum for the battery type connected and detected (See the first six rows of Table 2). Comparison of the battery voltage to the optimum established voltage thresholds may thus be used to provide a user indication of battery life at an optimum point determined by battery type.

Similarly, other radio parameters may be adjusted in accordance with battery type. In the preferred embodiment of the invention used in a cellular portable radiotelephone, the output power of transmitter 117 can be adjusted to a maximum power level determined by the particular battery type connected to the radio transceiver 103. The mobile or portable subscriber equipment for cellular radiotelephone application has the capability of a plurality of transmitter output power levels, one of which is selected by the fixed site equipment. (see Fisher, "A Subscriber Set for the Equipment Test", Bell System Technical Journal, Vol. 58, No. 1, January 1979, pp. 123-143, showing early multiple transmitter output power level cellular equipment). Thus selection, which may be changed during the course of a radiotelephone call, is based upon the signal level received by the fixed site equipment. A received signal which is too strong will cause the fixed site equipment to command the mobile or portable to reduce the transmitter output power by one or more power level steps. Likewise, a received signal which is too weak will cause the fixed site equipment to command the mobile or portable to increase the transmitter output power level one or more step (up to a maximum output power for the class-mobile a portable-of subscriber unit). EIA Interim Standard, IS-3-D (March, 1987), "Cellular System Mobile Station-Land Station Compatibility Specification" defines six 4 dB power level steps from −2 dBW to −22 dBW for portable radiotelephone equipment (paragraph 2.1.2.2). Each of these power level steps has a given tolerance or +2 dB/−4 dB from the nominal level.

Although some radiotelephone systems place stringent minimum transmitter power output requirements on user equipment, other systems may utilize the selectable transmitter output to enhance user equipment battery life. As the battery charge becomes depleted with use in the portable radiotelephone, the voltage available at the battery power contact 105 decreases. Each battery type has a different voltage versus charge characteristic which is shown generally in FIG. 7. The control and logic function 123 (of FIG. 1) may utilize knowledge of the battery type derived from battery type detector 125 and component 113 to determine which battery type characteristic is expected and to adjust the transmitter output power maximum characteristics according to the battery charge remaining (as implied by the battery terminal voltage). Furthermore, the operational life of the battery may be extended by reducing the transmitter maximum output power level at particular battery charge levels depending upon battery type. In a preferred embodiment of the present invention, three power output levels are employed for some battery types. These unique transmitter output power features may be better understood while referring to the seventh row of Table 2. Thus a battery type having a voltage versus time characteristic exhibiting a sharp drop off of voltage output after a particular amount of battery charge depletion can have the transmitter maximum output power level maintained at the maximum transmitter output power level for a long period of time with subsequent power output reductions. A battery type having a relatively linear decrease in output voltage versus battery charge will have the transmitter output power level reduced sooner.

Figure 9:
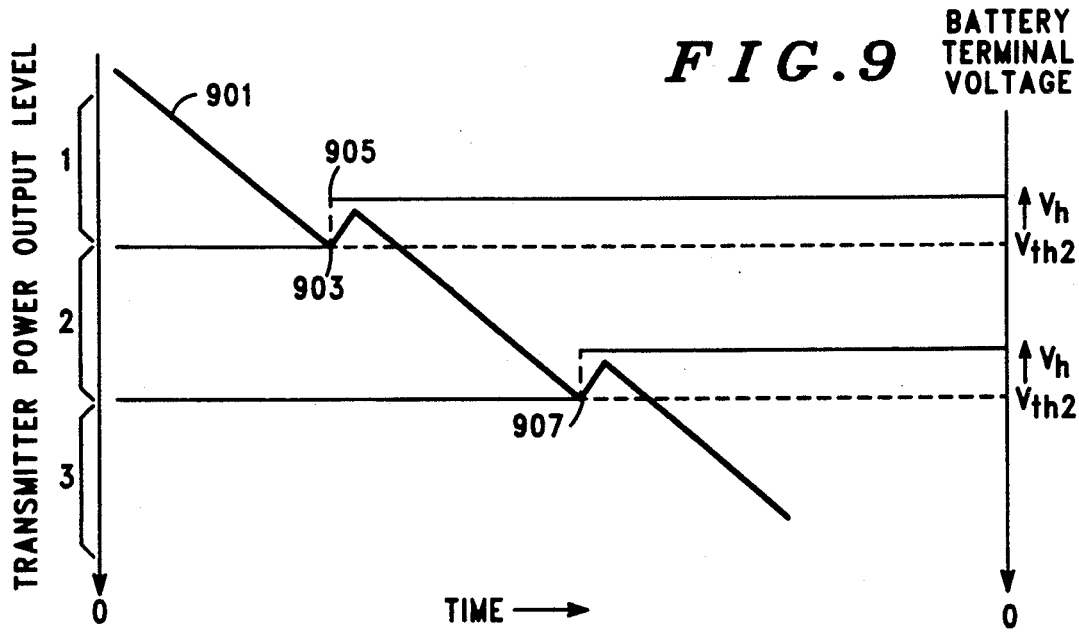
FIG. 9 is a graph of battery terminal voltage illustrating battery load change response, threshold hysteresis, and transmitter power output reduction which may be employed in the present invention.

Different battery types present different battery terminal voltage changes with changes in the load presented to the battery. When battery terminal voltage thresholds are established, the effect of load change must be considered and a hysteresis must be developed for the threshold battery terminal voltage. The value of battery load change hysteresis may be apprehended from FIG. 9. When the transmitter is operating, the battery terminal voltage decreases with time (curve 901). If the transmitter reduces its power output level at battery terminal voltage points determined in accordance with one aspect of the present invention, the reduced load on the battery will conventionally cause the battery terminal voltage to increase. Without hysteresis, such an increase in battery terminal voltage will cause the transmitter to reenter the higher power mode which causes the battery terminal voltage to decrease, etc. Hysteresis of the appropriate value for the particular battery type supplying power to the transmitter will prevent such a bistable oscillator from occurring. Thus, when the battery terminal voltage (901) reaches the voltage threshold ($V_{th1}$) between transmitter output power level 1 and power level 2 (at 903), the transmitter is changed to power level 2. In accordance with one aspect of the present invention, the value of threshold $V_{th1}$ is increased by the selected hysteresis value $V_n$ (as shown at 905). A similar threshold change occurs at point 907.

Another radio parameter which may be adjusted in accordance with battery type is that of the state-of-charge indicator type. In the preferred embodiment of the invention used in a cellular portable radiotelephone, a state of charge indication is visually provided to the user via user interface 121. Conventionally, a battery state of charge indicator makes its determination of the amount of charge in the battery by the battery terminal voltage. It uses the battery terminal voltage to determine into which of a finite number of state of charge ranges the battery is in (such as 100%, 80%, 60%, 40%, 20%, or 0% of full charge). However, different battery types have different characteristics of terminal voltage relative to the percentage of charge left (see FIG. 7). Thus, a predetermined and fixed voltage vs. percentage of charge characteristic may be accurate for one battery type but inaccurate for another battery type. Thus, an important feature of the present invention uses a different voltage vs. percentage of charge characteristic for each battery type. The characteristic is selected based upon the battery type which is detected as previously described.

An alternative charge state indicator is one which determines the state of charge by keeping track of the time the unit is used, calculating the amount of charge used, comparing the amount of charge used against the full capacity of the battery and providing the charge state to the user via user interface 121. The equipment being operated can draw different amounts of charge per unit time depending upon the battery type being used and different battery types may have different amounts of charge capacities. Thus, a predetermined and fixed calculation of charge state may be optimum for one battery type but non-optimum for another battery type. An alternative implementation of the present invention uses a selectable set of charge capacities and charge depletion rates for each battery type.

Figure 2:
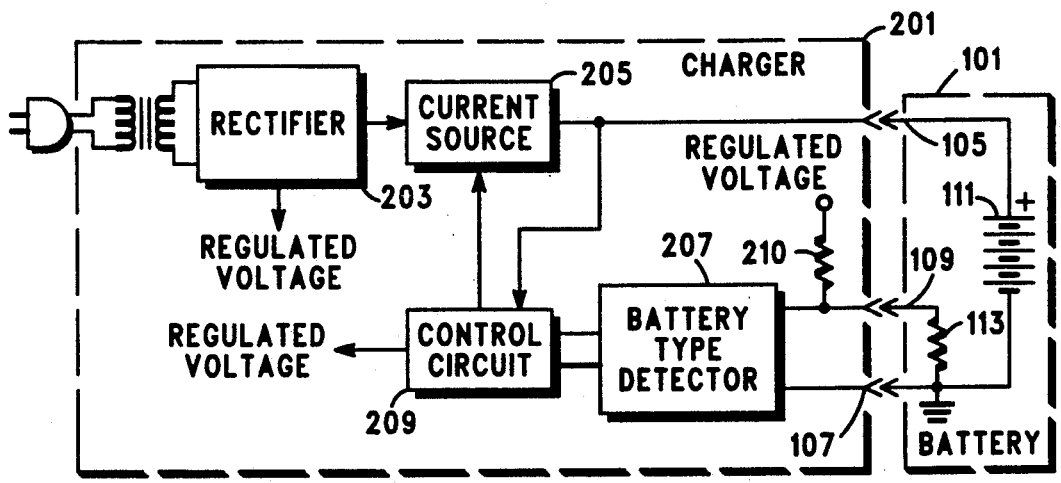
FIG. 2 is a block diagram of a battery charger and battery which may employ the present invention.

A battery charger which may employ the present invention is shown in the schematic block diagram of FIG. 2. A battery charger such as charger 201 may employ conventional rectifier circuitry 203 and conventional current sourcing and regulating circuitry 205. Such circuitry may be found in previously disclosed documents such as aforementioned U.S. Pat. No. 4,006,396. A battery charger which employs the present invention utilizes a battery type detector 207 and charge control circuitry 209. The battery type detector 207 measures the voltage potential generated across component 113 of the voltage divider of resistor 209 and electronic component 113. Battery type detector 207 determines the battery type from the sense input potential and communicates the battery type to control circuit 209. Control circuit 209 contains predetermined information about the battery type and it will establish the rate and types of charge controls to provide an optimum rate of charge for a rechargeable battery while not charging a non-rechargeable battery type.

In the preferred embodiment of the present invention in a battery charger, a charge state indicator may operate as described previously. The battery terminal voltage is used to determine the battery percentage capacity. However, when a battery is being charged the terminal voltage may not be monotonic with the percentage charge in the battery. This effect occurs in NiCd batteries being rapid charged and has been used in some chargers to terminate the rapid charge cycle (this technique is commonly known as "DV charging"). A battery charger may charge one battery type differently than another battery type and the terminal voltages vs. percentage capacities may be different. Thus, one set of terminal voltages vs. percentage charge may be optimal for one battery type but not for another. The present invention selects a different set of terminal voltages vs. percentage charge for each battery type.

Figure 3:
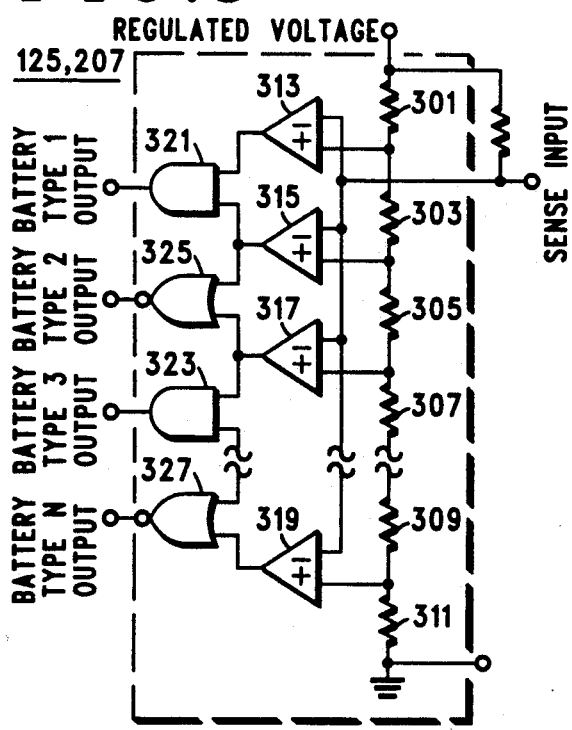
FIG. 3 is a schematic diagram of a window detector which may be employed as a battery type detector for the radiotelephone of FIG. 1 and/or the charger of FIG. 2.

Referring to FIG. 3, a schematic of one type of detector which may be employed as battery type detectors 125 or 207 is shown. The configuration shown in FIG. 3 is that of a "window" detector using comparators and NOR/AND gates. Alternatively, an analog to digital converter and microprocessor may be used to perform the same sort of battery type detection. One conventional microprocessor (an MC68HC11A8, available from Motorola, Inc.) internally contains an analog to digital converter and may be programmed to perform the required comparison. In FIG. 3, a regulated voltage is serially voltage divided by resistors 301, 303, 305, 307, 309, and 311 to produce N voltage levels which are applied to the positive input port of N conventional comparators 313, 315, 317, and 319. The sense input signal is applied to the negative input of comparators 313, 315, 317, and 319. The outputs of the comparators are applied to inputs of AND and NOR gates 321, 323, 325, and 327 as shown in order to provide detection windows for the battery types. The output signals from battery type detectors 125 and 207 are on N output lines. In general, a resistor used as electronic component 113 in the battery enables the detection of a number of battery types limited primarily by the decision of the detector.

Figure 4:
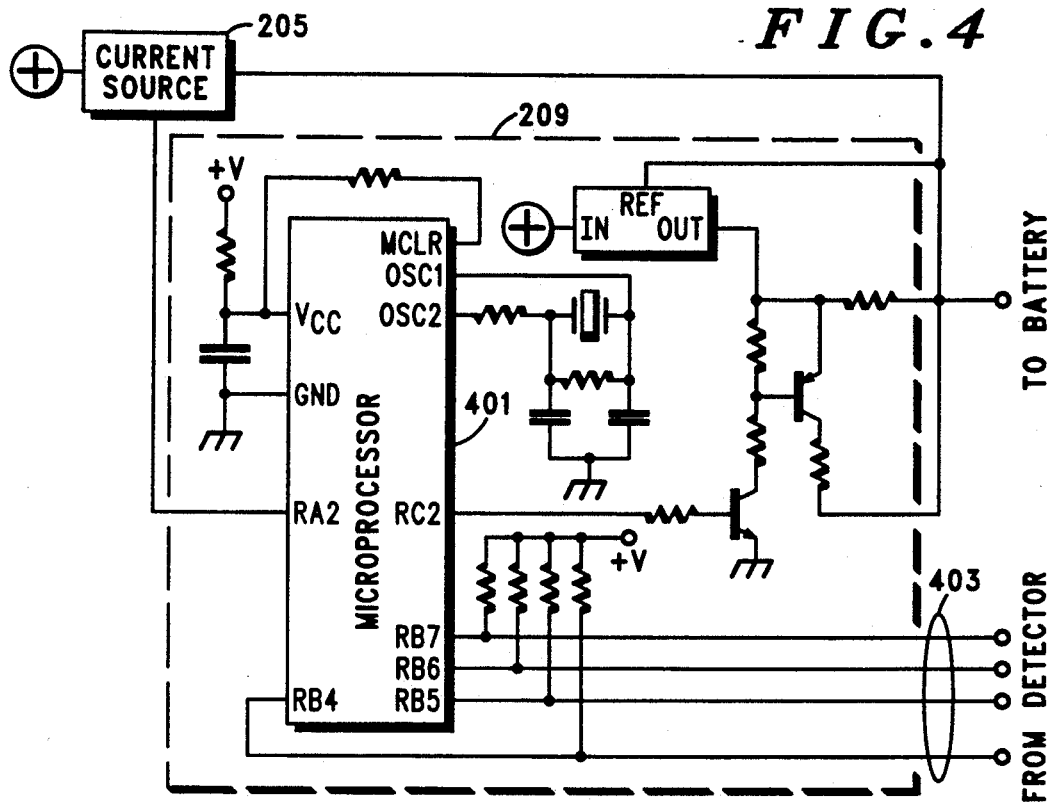
FIG. 4 is a schematic diagram of a control circuit for the battery charger of FIG. 2.

A battery charger control circuit 209 is shown in more detail in the schematic diagram of FIG. 4. A microprocessor 401 (such as an PIC16C55 available from Microchip, Inc.) is used in the present invention to control the charging conditions for the battery based upon the battery type detected and applied to microprocessor 401 via detector output line 403. Upon detection of a particular battery type, microprocessor 401 recalls form its internal memory the charging characteristics of the particular battery type connected to the battery charger 201. The battery terminal voltage is sensed by conventional voltage detection techniques and input to microprocessor 401 where it is compared with the battery terminal voltage charge characteristic curve recalled from storage and the appropriate amount of current is allowed to enter the battery terminals as determined by microprocessor 401 and current source 205.

The aforementioned U.S. Pat. No. 4,006,396 discloses a technique of determining battery charge rates by detecting a particular battery type. Different battery types also require type-specific charge controls to realize optimum charge performance. For example, the present invention may be employed in the selection of charge control controls such as: voltage cutoff (in which the charging is terminated when the battery terminal voltage exceeds a selected threshold), time (when the battery charging is terminated or reduced to a trickle charge after a selected period of time), temperature cut off (in which the fast rate charging is terminated when the electrochemical cells exceed a selected temperature), temperature-controlled voltage cutoff (in which the selected voltage cutoff threshold is selectively temperature compensated for electrochemical cell temperature), and $\Delta v$ charging (in which a selected slope of battery terminal voltage versus time is employed to determine the time at which charging is reduced or terminated). These charge controls are further shown in Table 3.

Some types of batteries (for example NiCd cell batteries) are susceptible to damage if rapid charging is not carefully controlled. High temperatures generated during rapid charging may cause damage to the battery and, in extreme situations, may cause the battery to explode. Furthermore, as disclosed in U.S. Pat. No. 4,727,306 (showing a dual charge rate battery charger having charge rate control), a battery being charged at a rate less than its maximum rate but greater than its minimum may also cause damage to the battery. Each battery type, then, in the present invention has its optimum maximum and minimum charge rates recalled and applied during its charging cycle.

Figure 5:
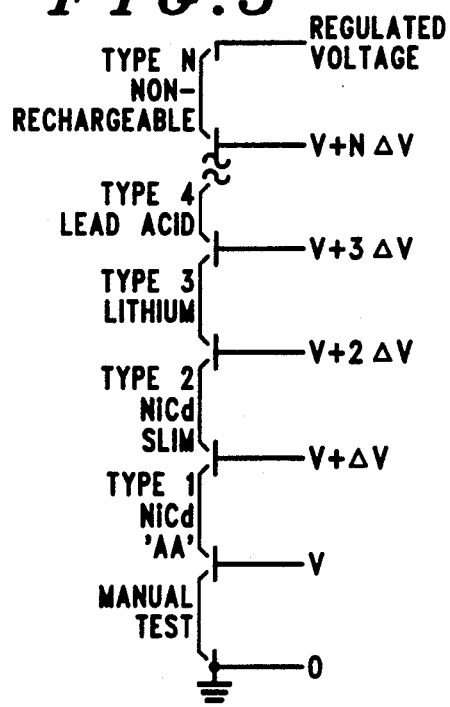
FIG. 5 illustrates the various voltage windows which may be sensed by the battery type detector of the present invention.

FIG. 5 illustrates the various voltage windows which are generated across electronic component 113 (within the battery) when a known regulated voltage is applied to a voltage divider including electronic component 113.

Figure 6A:
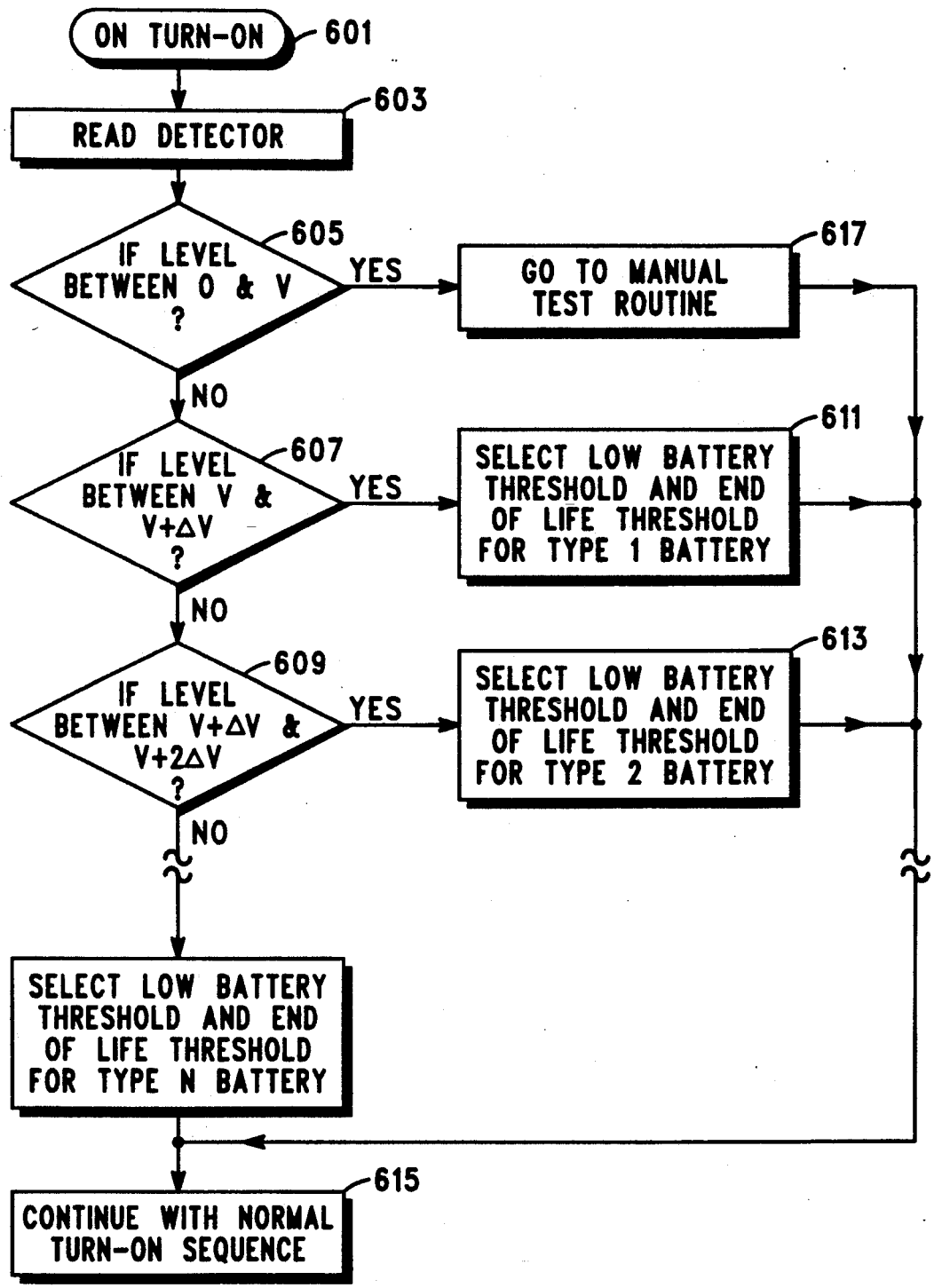
FIGS. 6a through 6d are flowcharts which indicate the response of the portable radiotelephone of FIG. 1 to a detected battery type.

FIG. 6a is a flowchart employed by the microprocessor of a portable radiotelephone in its logic and control function 123 in the preferred embodiment of the present invention. This method shows how the radiotelephone responds to a determination of a particular battery type and sets the appropriate low battery alert thresholds and software turn off thresholds for the battery end of life. It is anticipated that each different battery type can have an independent set of thresholds. Following turn on of the radiotelephone equipment at step 601, the detector input is read at step 603. (If an analog to digital converter is used in the realization of a battery type detector, step 603 would entail the reading of the output value generated by the analog to digital converter). A determination that the detected level is greater than one volt (as indicated from test 605) results in a test of whether the level is between one volt and an incremental voltage ($\Delta v$) over one volt, at test 607. If the sense input level exceeds one volt plus $\Delta v$ a test is made to see if the sense input is between one volt plus $\Delta v$ and one volt plus 2 $\Delta v$ (at test 609). The determination of the sense input voltage window continues in a similar manner until the window is found. Upon detection of the sense input voltage being within a particular window results in the battery threshold and end of life thresholds for the particular type of battery detected. This is indicated in steps 611 or step 613 of this process. Once the thresholds have been recalled and set, the process continues with its normal turn on sequence at 615.

A unique process occurs if the sense input is detected in the window between zero volts and one volt. In one implementation of the preferred embodiment a "manual test" subroutine is entered (at 617). This manual test subroutine allows servicing personnel to manually energize the transceiver functions and is particularly useful when the radiotelephone transceiver 103 is placed in an appropriate test power supply and enables a service technician to determine problem areas within the radiotelephone 103. A fail-safe system is also employed to prevent damage to a battery by deep discharge if the sense contact 109 is broken or misaligned. The radiotelephone transceiver 103 assumes a low battery alert and turn off default values so chosen that no damage will occur to any of the various battery types used in the system.

Figure 6B:
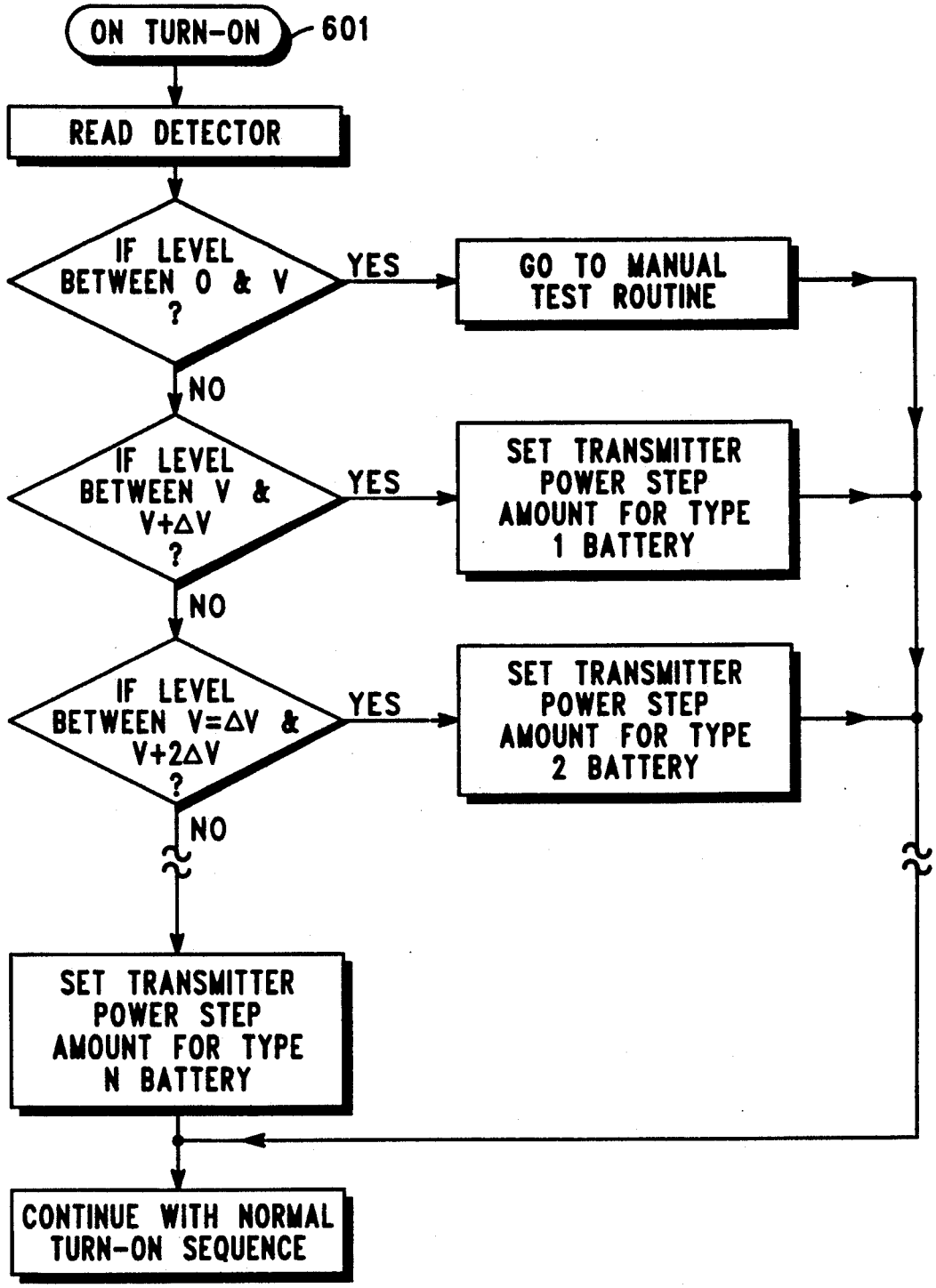
Figure 6C:
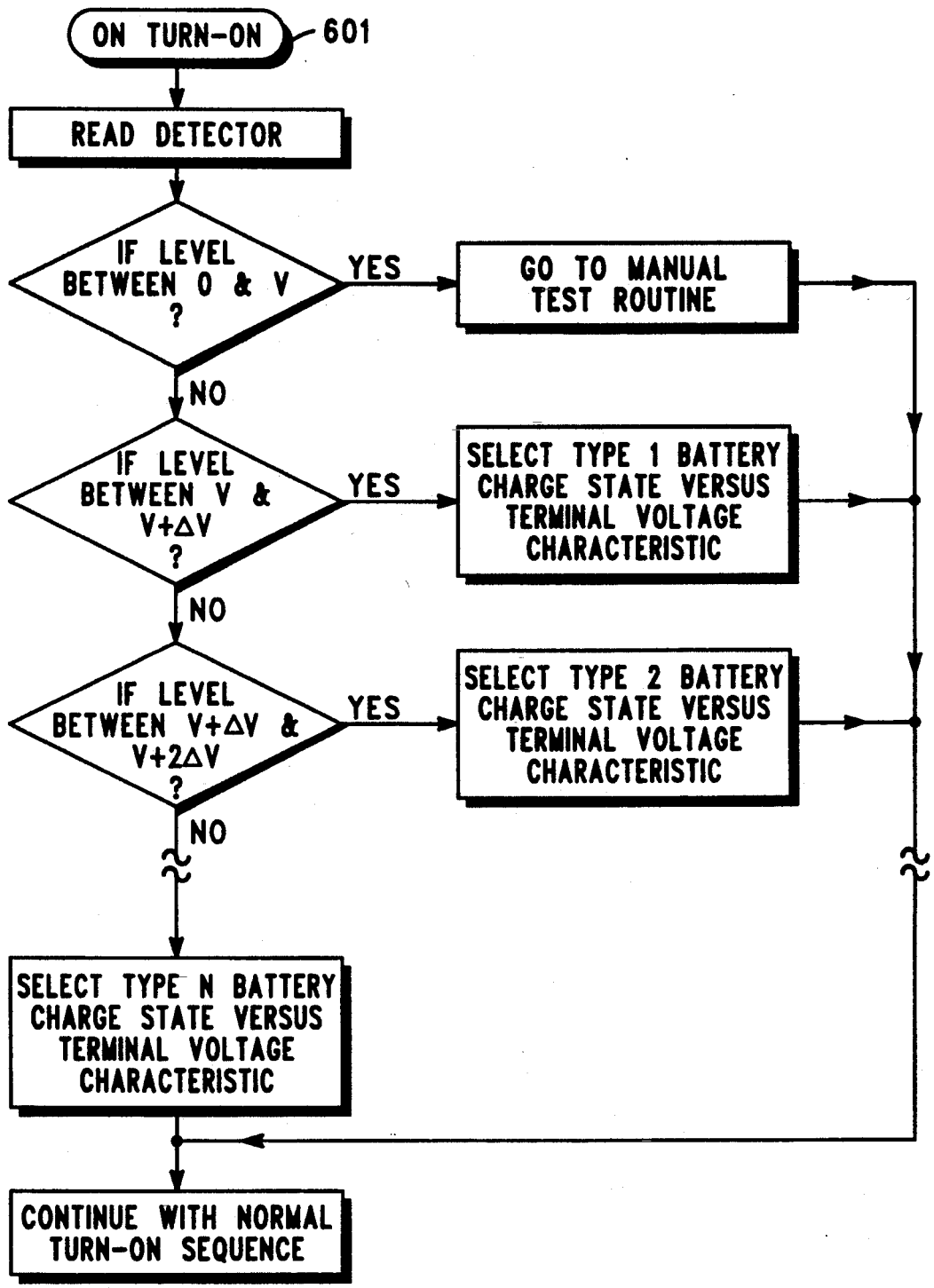
Figure 6D:
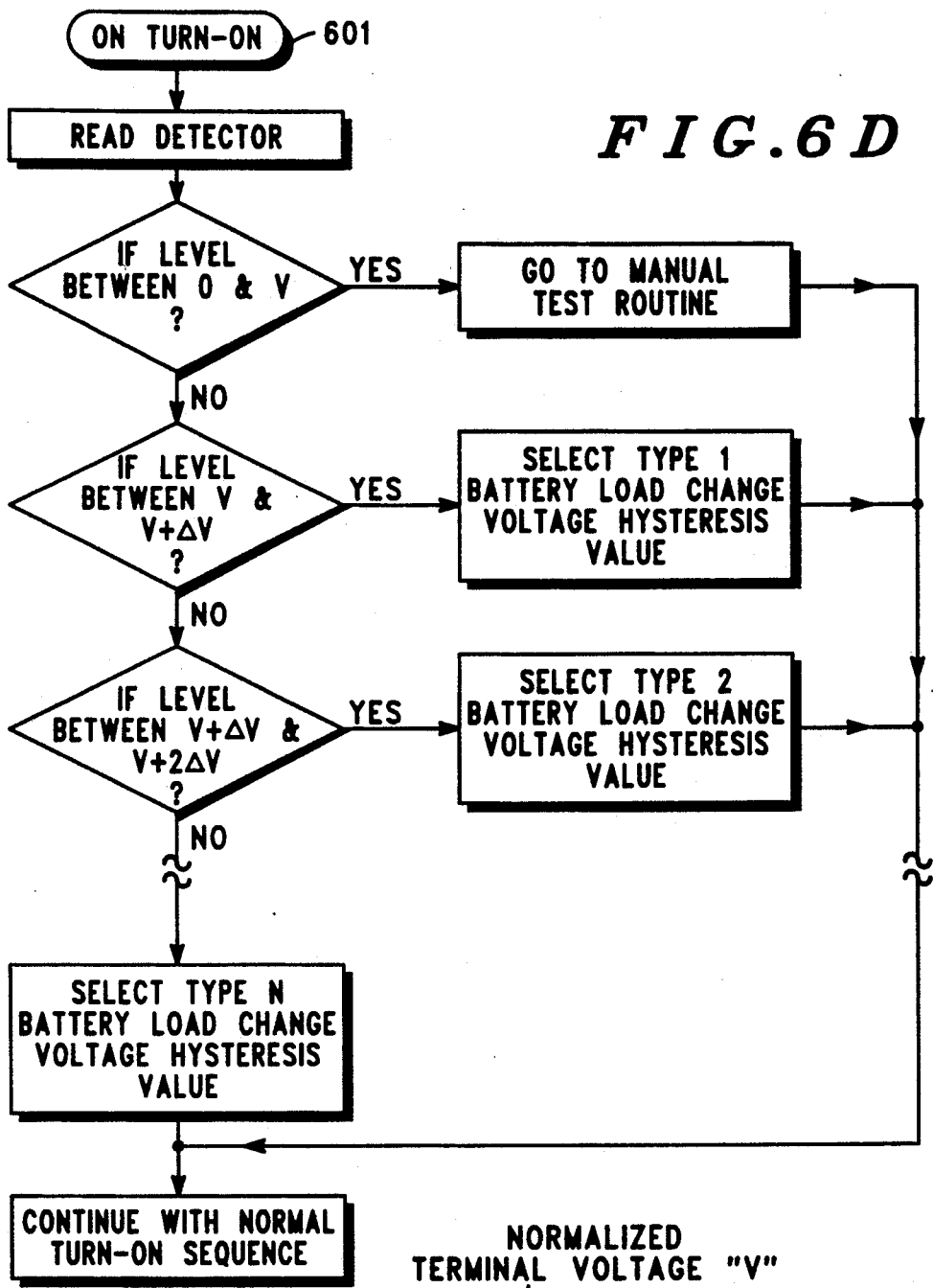

A similar method of detection is used to set the transmitter power step amount (see FIG. 6b) to establish the battery terminal voltage versus level of charge characteristics stored for particular battery types (see FIG. 6c). Likewise, the battery load change hysteresis time constant and expected voltage step for each particular battery type (see FIG. 6d) may be selected. A portable radiotelephone transceiver 103 may utilize one or more of these methods simultaneously in order to establish the operating characteristics of the portable radiotelephone transceiver.

Figure 7:
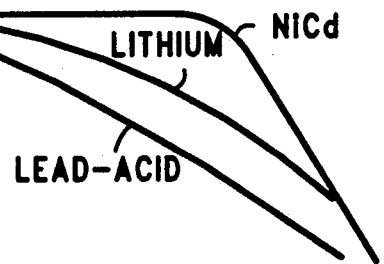
FIG. 7 is a graph of a normalized battery terminal voltage versus battery charge level for various battery types.

The general shape of the battery terminal voltage versus battery charge level characteristics are shown in the graph of FIG. 7. Several battery types are represented in the three curves shown.

Figure 8:
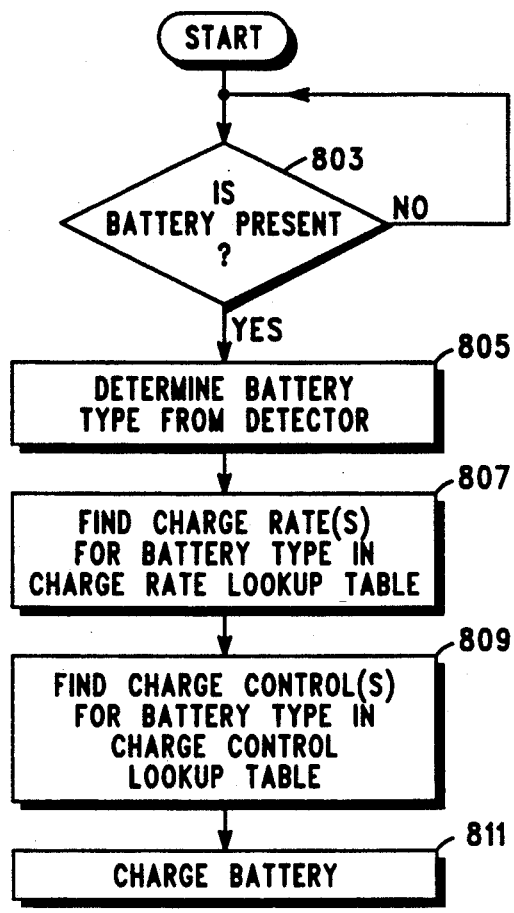
FIG. 8 is a flowchart which indicates the response of the battery charger of FIG. 2 to a detected battery type.

The method employed by microprocessor 401 of a battery charger employing the present invention is shown in the flowchart of FIG. 8. Upon determining that a battery is present at step 803, the detector output is read and the battery type is determined at step 805. The optimum battery charge rate is determined from the memory of microprocessor 401 from the look-up table, at step 807. The look-up table in the memory of microprocessor 401 is further searched to find the charge controls for the particular battery type determined at step 805, in step 809. In the preferred embodiment, the charge control parameters and values used in the battery charging process are shown in Table 3. The battery is then charged at the rate determined from the charge rate look-up table and with the controls also determined from the control look-up table, at step 811.

Therefore, a battery type detector has been shown and described. Different battery types exhibit different discharging and charging characteristics. To optimize battery use and lifetime in battery powered equipment, operating characteristics of the battery powered equipment are modified in accordance with the detected battery type. Likewise, to optimize battery charging operations, charge control parameters of battery chargers are modified in accordance with a detected battery type. While a particular embodiment of the invention has been shown and described, it is to be understood that the invention is not to be taken as limited to the specific embodiment herein and that changes and modifications may be made without departing from the true spirit of the invention. It is therefore contemplated to cover the present invention, and any and all such changes and modifications, by the appended claims.

TABLE 2

| BATTERY OPERATED EQUIPMENT PARAMETERS | | | | | |
|---|---|---|---|---|---|
| | DE-FAULT | TYPE A | TYPE B | TYPE C | TYPE N |
| Low Bat Warning Threshold Receive Mode | 5.80 | 5.75 | 5.65 | 5.60 | 5.80 |
| Low Bat Turn Off Threshold Receive Mode | 5.20 | 5.20 | 5.20 | 5.20 | 5.10 |
| Low Bat Warning Threshold Transmit Mode | 5.50 | 5.50 | 5.40 | 5.30 | 5.35 |
| Low Bat Turn Off Threshold Transmit Mode | 5.20 | 5.20 | 5.20 | 5.10 | 5.10 |
| Low Battery Threshold | 0.40 | 0.40 | 0.32 | 0.20 | 0.25 |

TABLE 2-continued

| BATTERY OPERATED EQUIPMENT PARAMETERS | | | | | |
|---|---|---|---|---|---|
| | DE-FAULT | TYPE A | TYPE B | TYPE C | TYPE N |
| Hysteresis Constant Change State Parameter(s) | | | | | |
| High | 6.05 | 6.05 | 6.55 | 5.85 | 5.90 |
| Low | 5.65 | 5.65 | 6.05 | 5.35 | 5.50 |
| Max Transmitter Power Output Parameter(s) | 02B | −3 | −1 | 0 | 0 |
| | −3 | −4 | −3 | −2 | 0 |
| | −6 | −6 | −5 | −4 | 0 |
| TX Hysteresis Voltage | 0.1 | 0.08 | 0.15 | 0.20 | 0.10 |

TABLE 3

| BATTERY CHARGER CHARGE CONTROLS PARAMETERS | | | | | |
|---|---|---|---|---|---|
| | DEFAULT | TYPE A | TYPE B | TYPE C | TYPE N |
| High Change Rate (Current Level) | OmA | 400 mA | 60 mA | 700 mA | 2000 mA |
| Low Charge Rate | OmA | 60 mA | 80 mA | 10 mA | 150 mA |
| Temperature Cutoff | 40 C. | 45 C. | 55 L | 45 C. | 40 C. |
| Voltage Cutoff | 0 V | Disabled | 7.5 | Disabled | 8.2 V |
| High to Low Charge Rate Voltage Switch Point | 0 V | Disabled | Disabled | Disabled | 7.9 V |
| Timer | 0 min | Disabled | 10 hours | 8 hours | Disable |
| Charge Method | No Charge | DV and Temp. Cutoff Dual Rate | Voltage Cutoff and Temp. Cutoff Timer | Temp. Cutoff and Timer Dual Rate | Temp. Cutoff and Voltage Cutoff Rate Change Voltage Dual Rate |

We claim:

1. A battery type detector for determining which type of battery is coupled to a battery charger, the battery and the battery charger each having a housing, the battery type detector comprising:
    means for producing a predetermined one of a plurality of sense levels corresponding to a battery type comprising;
        a regulated voltage,
        a first resistor disposed within the battery charger housing, and
        a second resistor having a resistance selected in accordance with said particular battery type and disposed within the battery housing, the battery housing having positive, negative, and sense terminals disposed thereon, and said first resistor coupled between said regulated voltage and said sense terminal and said second resistor coupled between said sense terminal and said negative terminal; means for detecting said one of a plurality of sense levels; and
    means, responsive to said means for detecting, for enabling a predetermined battery charging control in the battery charger corresponding to said battery type.

2. A battery type detector in accordance with claim 1 wherein said means for detecting further comprises a window detector having a plurality of output terminals, one of said output terminals providing said signal identifying said one of a plurality of sense levels.

3. A battery type detector in accordance with claim 1 wherein said means for detecting further comprises a microprocessor.

4. A battery type detector in accordance with claim 3 wherein said means for detecting further comprises an analog to digital converter coupled to said microprocessor.

5. A battery type detector in accordance with claim 1 wherein said means for enabling a predetermined battery charging control further comprises means for selecting one of at least two temperature cutoff thresholds.

6. A battery type detector in accordance with claim 1 wherein said means for enabling a predetermined battery charging control further comprises means for selecting one of at least two voltage cutoff thresholds.

7. A battery type detector in accordance with claim 1 wherein said means for enabling a predetermined battery charging control further comprises means for selecting one of at least two battery charge rate switch points at which switch point the battery charger switches from high charge rate current to low charge rate current.

8. A battery type detector in accordance with claim 1 wherein said means for enabling a predetermined battery charging control further comprises means for selecting one of at least two battery charge times.

9. A battery type detector in accordance with claim 1 wherein said means for enabling a predetermined battery charging control further comprises means for selecting one of at least two battery charge methods.

10. A battery type detector for determining which type of battery is coupled to a battery charger, the battery and the battery charger each having a housing, the battery type detector comprising:
　　means for producing a predetermined one of a plurality of sense levels corresponding to a battery type comprising;
　　　a regulated voltage,
　　　a first resistor disposed within the battery charger housing, and
　　　a short circuit selected in accordance with said particular battery type and disposed within the battery housing, the battery housing having positive, negative, and sense terminals disposed thereon, and said first resistor coupled between said regulated voltage and said sense terminal and said short circuit coupled between said sense terminal and said negative terminal; means for detecting said one of a plurality of sense levels; and
　　means, responsive to said means for detecting, for enabling a predetermined battery charging control in the battery charger corresponding to said battery type.

11. A battery type detector for determining which type of battery is coupled to a battery charger, the battery and the battery charger each having a housing, the battery type detector comprising:
　　means for producing a predetermined one of a plurality of sense levels corresponding to a battery type comprising;
　　　a regulated voltage,
　　　a first resistor disposed within the battery charger housing, and
　　　a short circuit selected in accordance with said particular battery type and disposed within the battery housing, the battery housing having positive, negative, and sense terminals disposed thereon, and said first resistor coupled between said regulated voltage and said sense terminal and said short circuit coupled between said sense terminal and said positive terminal; means for detecting said one of a plurality of sense levels; and
　　means, responsive to said means for detecting, for enabling a predetermined battery charging control in the battery charger corresponding to said battery type.

12. A battery type detector for determining which type of battery is coupled to a battery charger, the battery and the battery charger each having a housing, the battery type detector comprising:
　　means for producing a predetermined one of a plurality of sense levels corresponding to a battery type comprising;
　　　a regulated voltage,
　　　a first resistor disposed within the battery charger housing, and
　　　an open circuit selected in accordance with said particular battery type and disposed within the battery housing, the battery housing having positive, negative, and sense terminals disposed thereon, and said first resistor coupled between said regulated voltage and said sense terminal and said open circuit coupled between said sense terminal and said negative terminal;
　　means for detecting said one of a plurality of sense levels; and
　　means, responsive to said means for detecting, for enabling a predetermined battery charging control in the battery charger corresponding to said battery type.

* * * * *